Jan. 15, 1952  J. B. LONGENECKER  2,582,261
CARAMEL COLOR MANUFACTURE
Filed Jan. 13, 1950

INVENTOR.
JOSEPH B. LONGENECKER

BY Greene & Durr
ATTORNEYS

Patented Jan. 15, 1952

2,582,261

UNITED STATES PATENT OFFICE 2,582,261

CARAMEL COLOR MANUFACTURE

Joseph B. Longenecker, Granite City, Ill., assignor to Union Starch & Refining Company, Columbus, Ind., a corporation of Indiana Application January 13, 1950, Serial No. 138,358

7 Claims. (Cl. 127—34)

This invention relates to a novel caramel color (sugar color, burnt sugar coloring, etc.) and the process for the production of such caramel color. More particularly this invention relates to a caramel color having new and unusual properties that render it superior to caramel colors previously available and the processes necessary for obtaining these properties.

This application is a continuation-in-part of my application Serial No. 572,732, filed January 13, 1945, now abandoned.

The caramel color of the present invention may be formed from suitable carbohydrates such as sucrose and inverted sucrose, reducing sugars, hydrolysis products of all commercial starch, such as from corn, tapioca, rice, sago, wheat and sweet potatoes, and especially from the hydrolysis products of corn starch commonly known as corn sugars. The latter are usually designated as "70" or "80" sugars in commerce because they contain approximately 70 or 80% of reducing sugars, calculated as dextrose. Pure dextrose sugar may, of course, be used by hydrolysis of the above starches, or other reducing sugars may be produced by chemical means.

Hydrolysis products of starches which contain lower amounts of reducing sugars than the proportions found in the commercial corn sugars may be utilized by this process. Partially exhausted mother liquors from which a portion of the sugar has been crystallized, such as molasses or hydrol, will serve to make caramel color by the process here related.

Pure dextrose or sugars made by acid hydrolysis and suitable refining processes from good quality starch are preferable raw materials for the application of this process and for production of caramel colors of the very highest quality. The other materials named above may be used to make caramel colors suitable for many purposes and of superior quality to that produced by previous processes.

A principal object of this invention is to provide a commercially practical method of producing caramel color from hydrolysis products of starch or other suitable carbohydrates that will provide a product of high acid fastness or stability in acid solution.

The various caramel colors hitherto produced have not had a particularly high stability in the presence of acid. This is undesirable because when a beverage concentrate is made from the usual ingredients including the caramel color the acidity of the beverage concentrate causes the caramel color which is a collodial system, or, at least, a system in which the color bodies are dispersed in very finely divided state, to coagulate or floc out. This disposition of the color to floc out or curdle may be intensified by the presence of other constituents, e. g., tannins, commonly present in normal beverages in acid solution. This flocking out or curdling may take place with the previously available inferior caramel color during the normal time periods and temperature conditions encountered in the transportation and storage of beverage concentrates and is particularly troublesome if it is necessary to store the beverage concentrate for extended periods.

Even in the dilute form of the finished bottled carbonated beverage this coagulation and precipitation can and does take place with the low acid-proof caramel to such an extent that the appearance of the beverage and certain of its qualities are seriously impaired.

It is accordingly an object of this invention to overcome these deficiencies and to produce a caramel color that is resistant to the effect of an acid condition and to those other constituents of beverages which end to bring about coagulation.

Ordinary caramel colors are notably deficient in another important respect which may be described as the tendency to deteriorate rapidly in storage. This deterioration takes the form of a disposition to thicken or increase in viscosity to a marked degree until the caramel color will not pour or disperse and has therefore become useless for the purpose of a coloring agent. Normally the caramel color of commerce is marketed as a liquid of 36° to 40° Baumé. It is a heavy, viscous liquid and has a sirupy consistency in this range of concentration. A common fault is that the liquid is too viscous for convenient pouring, measuring, draining from containers and general handling. This troublesome viscosity will always increase with age until the material becomes a semi-solid mass of jelly-like consistency. Such material is useless as it cannot be dispersed to give satisfactory tinctorial power and is extremely unstable and will flock out even if forced into solution.

It is therefore another object of this invention to overcome these deficiencies and to produce a caramel color that is resistant to serious deterioration by thickening in storage or on aging.

It is further object of the present invention to provide a novel acid proof caramel color and the process of making the same wherein the caramel color remains substantially unchanged and unaffected over an extended period of time and under varying temperature conditions in dilute form in the presence of acids and other coagulants or in undiluted form in storage.

The process set forth herein accomplishes the above objectives in a most satisfactory manner and to a degree providing very desirable properties in respect to acid fastness and resistance to deterioration with age. The caramel color produced is markedly superior in these properties over the usual caramel colors of commerce. This superiority may be illustrated as follows:

Acid fastness or stability in solutions of acid reaction is estimated by laboratory tests which, although empirical in nature, are widely used and are rather reliable guides to evaluation of this property. These tests aim at subjection of solutions of the caramel color to more severe conditions of heat and acidity than they are likely to encounter in normal usage.

By way of example a common acid test is as follows:

Sufficient hydrochloric acid is added to 250 ml. or a 0.2% solution of caramel color to make the solution 0.33 N with respect to the acid. This solution is placed in a flask, capped with a beaker and boiled for five minutes. The solution is removed from the heat and it is observed to determine if any precipitate or haze has developed. It is then set aside for reobservation and recording of results 24 hours later. A convenient system of grading by this test is as follows:

Brilliantly clear after boiling and 24 hrs. later _____ A
Slight haze 24 hrs. after boiling_____ B
Slight precipitation 24 hrs. after boiling____ C
Medium precipitation 24 hrs. after boiling__ D
Heavy precipitation 24 hrs. after boiling____ E
Precipitation during boiling_____ F A more severe variant of this test is to boil a portion of the above solution for 30 minutes and record as above.

Resistance of the caramel color to another type of coagulant commonly found in beverages, etc., may be measured by the so called tannin tests. Often two of these are used. One is described as the neutral tannin and the other as the acid tannin test.

All tests given here are described in a publication Anal. Ed. Ind. and Eng. Chem. 10, 349 (1938).

The caramel color made by the process described here will give brilliantly clear solutions when subjected to the above tests. The ratings are all A's if the raw material used is of the correct type and properly refined. Previously known caramel colors of commerce will usually give no better than two out of four A ratings when subject to the four tests above.

With respect to superiority of the caramel color described here in resistance to deterioration with age the difference is even more marked. It has been found through observation of a very large number of the usual commercial caramel colors that the increase of viscosity with age is quite rapid. Few are still fluid enough to pour after storage of one year and many are semi-solid in six months. This deterioration is accelerated by increase of storage temperature. The initial viscosity of many caramels is too high to permit of convenient handling.

The caramel color made by this process increases very slowly in viscosity on storage. Many samples of the material made by this process are still free flowing after two years storage at a concentration of 38° Bé. and an average temperature of 90° F.

In addition to its properties of extraordinary stability in acid solution, resistance to heat, tannin coagulation and extremely retarded deterioration with age, this caramel color exhibits other very desirable properties. It is very stable in high alcohol concentration, highly fluid and free flowing at low temperatures, free from carbon particles and very uniform in tinctorial power from batch to batch. It is also substantially free from the disagreeable odor and bitter flavor characteristic of many caramel colors. It is compatible with other similar types of colors of good quality and resistant to fermentation.

The coloring power of a caramel color is of primary interest providing the other properties are satisfactory. Coloring power is usually defined as the Lovibond reading of a caramel solution of 0.1% when measured in a color cell of 2.5 cm. (1 inch). The caramel made by the process of the present invention may be carried to higher then ordinary tinctorial power without loss of stability or any other desirable property.

The above recited results are accomplished generally by pretreating the carbohydrate to be caramelized in order to effect a reaction before the main caramelization of the material is effected. This pretreatment is carried out by controlled heating in the presence of different reagents.

Figure 1:
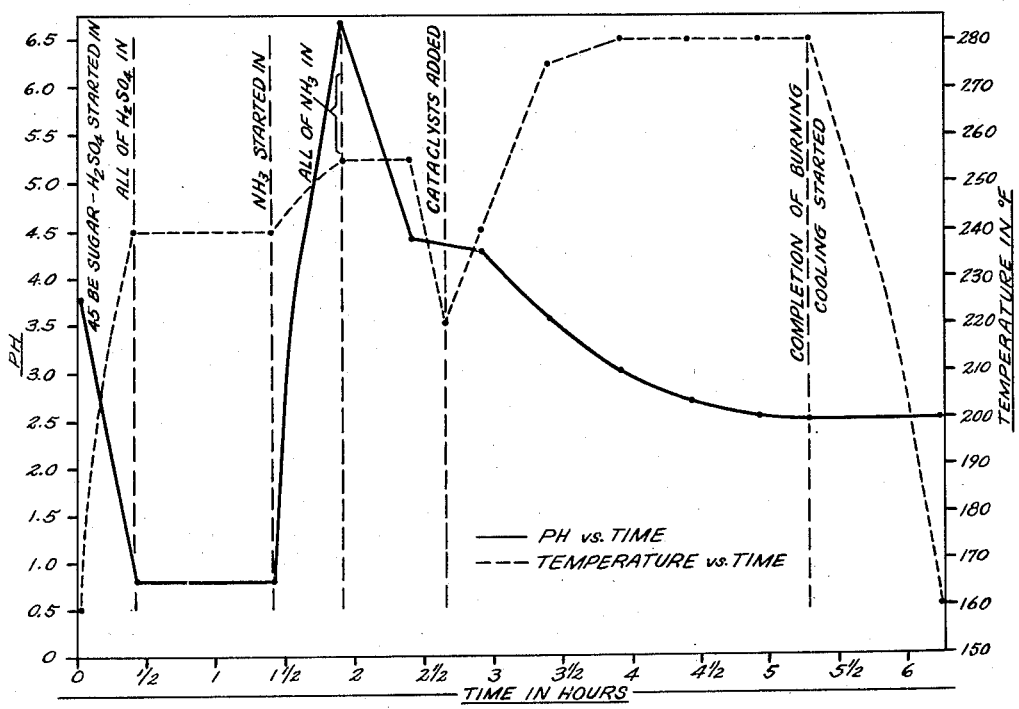
Figure 1 is a graph showing how the temperature and acidity of the treated syrup vary with time in a typical process.
Figure 2:
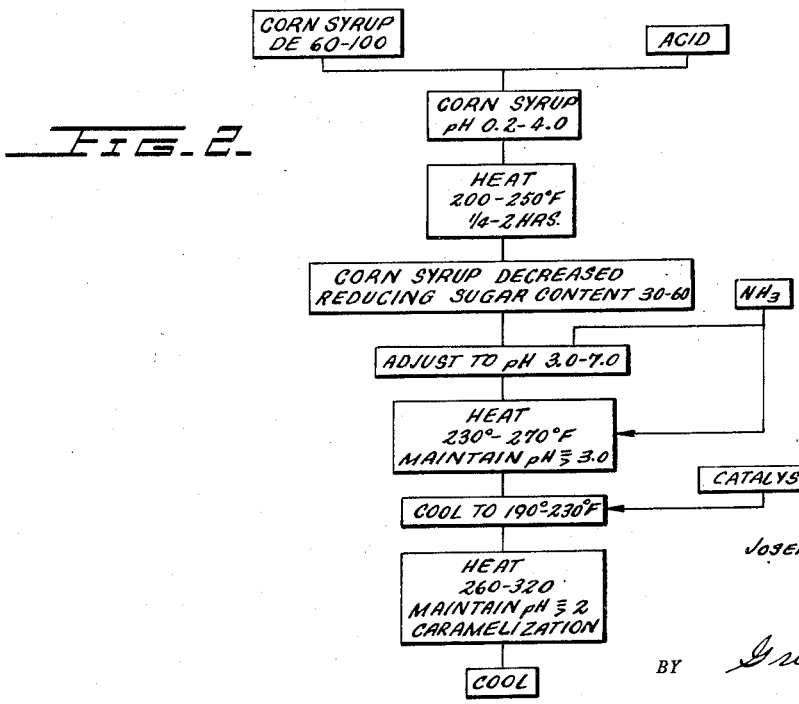
Figure 2 is a flow sheet illustrating the sequence of steps in the new process.

As shown in Figure 2 a corn syrup having a content of 60-100% of reducing sugars is first acidified to a pH of 0.2-4.0 and then heated to 200-250° F. for a period of ¼ to 2 hours. This treatment decreases the D. E. or reducing sugar content by 20-35% to a value of between 30-60%, as determined by the Munson and Walker method.

The preheating treatment at a low pH causes a chemical reaction which is manifested by a pronounced diminution of the dextrose equivalent or the reducing sugars calculated as dextrose. The exact nature of this reaction is not entirely clear but it appears to be closely related to the type of reaction which takes place in the final stages of starch hydrolysis and commonly referred to as reversion. It appears to be a type of condensation or polymerization in which the simple sugars are formed into larger units which may be polysaccharides or similar compounds. The extent of the reversion when hydrolysis has been carried to completion in relatively dilute starch suspension is only about 8% of the dry substance involved. When the reaction is forced to take place in concentrated solutions of dextrose or hydrolysis products of starch the decrease of reducing sugars and formation of the non-reducing compounds is much more pronounced and may be carried on until virtually no reducing power remains when tested by Fehling's solution or its modifications. The reaction may be controlled very readily to produce the desired degree of condensation, reversion or degradation of the reducing sugars.

This acid treatment in concentrated solution transforms the carbohydrates into materials which facilitate and improve the subsequent caramelization reaction.

A neutralizing agent (preferably anhydrous ammonia) is then added to the acid treated sugar liquor to bring the pH up to a value between 3.0 and 7.5. Other alkaline reagents such as alkali or alkali earth metal oxides or hydroxides or the alkali metal carbonates or phosphates or mixture thereof may be employed in place of part or all of the ammonia. The anhydrous ammonia is preferred however, since it does not add water or other foreign matter and serves a dual purpose in that (1) it acts as a neutralizing agent and, (2) the excess performs a function in promoting color formation during caramelization of the sugar solution. After the ammonia is added the liquid is preferably heated to a temperature of about 230° F. to 270° F. for a period of 15 minutes to 2 hours. This secondary preliminary step is very important since it further increases the acid fastness of the final caramel color although it is not absolutely essential to the process.

On completion of the second preliminary step the digestion liquor is cooled to within the range of 190 to 230° F. The solution could be cooled to a lower temperature, but this is unnecessary and uneconomical. In this temperature range the final reagents, including ammonium salts and a reducing agent are added. The reducing agent preferred is one of the three compounds; sulfur dioxide, sodium sulfite or sodium acid sulfite. The latter is the best in practice as it appears to have more than a single function. In addition to the reducing action it has an important value as a buffer agent. It stabilizes the pH in the range where caramelization proceeds most favorably and may be used to obtain the final pH desired. For example, sufficient sodium acid sulfite or other sulfite is added so that the total amount of sulfite comes within the range from .5 to 4% of the dry substance.

As will be apparent from an examination of Figure 2 (described in detail below) the pH of the syrup decreases as the caramelization process proceeds. When the pH is raised up to about 6 or 7 before heating to the caramelizing temperature, the pH of the syrup still remains above a value of 2.0 for a time which is sufficient to complete the caramelization. However, when the pH is raised only to a value of 3.0, for example, it is necessary to add ammonia or other alkalies at frequent intervals to prevent the pH from decreasing to a value of 2.0 or less.

When the term, "stable caramel color" is used in this specification and claims, a caramel color that is stable in acid solution, in alcohol solution and a solution of tannin and a color which is as pointed out hereinabove resistant to polymerization and jelling or agglomeration during storage is meant.

When ammonia is employed it may be added in amounts of 0.4 to 3.0% calculated on the dry substance and a portion thereof can be added in the form of ammonium sulfate. In the example below, for instance, 0.82% of ammonia is added as a neutralizing agent and 0.16% additional ammonia is added as ammonium sulfate when the reducing agent is added making a total of 0.98% of ammonia. Thus the ratio of free ammonia to ammonia as ammonium sulfate is 5 to 1 in the example, but this ratio can be decreased to as low as 3 to 1.

The exact nature of the functions of the sulfites and/or other reducing agents is not entirely clear in this reaction. It is not precisely known, for instance, just how much of the benefit is derived from the reducing function and how much should be ascribed to the formation of a complex or addition product which favors the caramelization. In any event it has been observed that the sulfites exert a very beneficial influence and one which is important to the acid fastness of the finished product.

After addition of the final catalysts, i. e., the sulfite compound and ammonia in some form which may be for example ammonium sulfite, ammonium sulfate, ammonium carbonate or other compounds of ammonia, the digestion liquor is heated to a temperature within the range 260 to 320° F. and held there until the desired caramelization is achieved or the required tinctorial power is obtained.

The final color is fixed by cooling rapidly to approximately 150° F. by circulation of cooling water through the jacket of the reaction vessel and by adding relatively cool water which serves the additional function of adjusting the final concentration that is desired, e. g. approximately 38° Bé.

*Example*

Reference is made to Figure 2 of the drawing which illustrates the variation in temperature and pH with respect to time in this example. For the most economic use of heat values the process is operated substantially continuously but it is obvious that the various steps may be disconnected if desired.

To 1600 gallons of 45° Bé corn sugar of 82 D. E. having a pH of 4.5, about 11 gallons of sulfuric acid (50%) is added to bring the pH to 1.0. This syrup is heated to 230° F. for one hour. This treatment brings the D. E. down to 42. Then 0.82% of anhydrous ammonia, based on the dry substance sugar, is added. The addition of the ammonia brings the pH to a value of 6.7.

The syrup is then heated to a temperature of 200–250° F., as shown on the temperature curve of Fig. 2, for 15 minutes, (this step can be omitted) and then is either positively cooled or permitted to cool to 210° F. whereupon the catalysts consisting in this example of a mixture of sodium acid sulfite (a reducing agent) and ammonium sulfate is added. About 2.7 of sodium acid sulfite based on the dry substance of sugar, and about 0.12% of ammonia (as ammonium sulfate) is added. The syrup is now heated to a caramelizing temperature of 280° F. As shown in Fig. 2 the pH gradually decreases during this caramelizing treatment. The burning or caramelizing is continued for 120 minutes whereupon the solution is cooled.

In the process recited here a caramel color especially suited for use in acidulated carbonated beverages is obtained with a minimum loss of dry substance resulting from the caramelization or "burning process." This process differs radically in many respects from any hitherto known in the art. It is believed that the preconditioning steps bring the sugars into a form which permits caramelization to take place more along the lines of a chemical reaction than by "burning" of the sugar. The products intermediate between sugars and caramel are formed in a stepwise manner and without the necessity of overburning and excessive concentration in processing as practiced in open equipment and by ordinary methods. The minute amounts of residual carbonaceous products formed are removed by centrifugal force in high speed centrifuging machines.

Attention is called to the fact that the preferred starting materials for this process are solutions of pure dextrose, substantially pure dextrose of the commercial corn sugars of approximately 80 to 85 dextrose equivalent. These solutions are preferably concentrated to approximately 45° Bé as these materials have been found to respond most satisfactorily to this method of processing when in these ranges of reducing sugars content and concentration. However, it is obvious that it is within the scope of the process to handle starches or starch hydrolysis products and other carbohydrates which may be hydrolyzed with acid and heat to reducing sugars although they have not been processed to the most desirable level before introduction into the process.

This condition of starting material will require more time and careful control but the hydrolyzable materials can be made to come to a satisfactory content of reducing sugars and concentration by application of the acid pretreatment and heat which will bring about hydrolysis if the entering carbohydrates are not fully hydrolyzed before the essential function of the pretreatment, which is manifested by lowering of dextrose equivalent, begins. It is, therefore, within the scope of this invention to use carbohydrates which may be brought to the desired condition for processing by the pretreatment process in itself. The heat treatment in an acid condition will cause hydrolysis if the material subjected to these conditions is susceptible to this reaction within the limits of conditions described herein and concentration may be brought about by merely venting the process vessel if closed or by using an open kettle. It is emphasized, however, that the primary purpose of the pretreatment is not simple hydrolysis but rather the reaction which takes place when hydrolysis will not proceed further and reversion or diminution of reducing power sets in.

It will be understood that the examples and description of the process above set forth relate to a particular method utilizing the present invention. The various modifications within the scope of this invention will be obvious to those skilled in the art from the principles above set forth.

I claim:

1. The process of producing a new caramel color of high acid stability which comprises pretreating a carbohydrate syrup which has a reducing sugar content calculated as dextrose of 60 to 100% by acidifying the said syrup to a pH of 0.2-4.0 and heating the acidified syrup to a temperature of 200 to 250° F. for a period of ¼ to 2 hours to substantially decrease the reducing sugar content, adding an alkaline reagent selected from the group consisting of ammonia and ammonium compounds to increase the pH to 3 to 7.5 and caramelizing the resulting syrup while maintaining the acidity thereof above pH 2.0.

2. The process of producing a new caramel color of high acid stability which comprises pretreating a carbohydrate syrup which has a reducing sugar content calculated as dextrose of 60 to 100% by acidifying the said syrup to a pH of 0.2-4.0 and heating the acidified syrup to a temperature of 200 to 250° F. until the reducing sugar content has been diminished by 20-65% and is lowered to a level within the range of 30-60%, adding an alkaline reagent selected from the group consisting of ammonia and ammonium compounds to the digestion mass to increase the pH to 3.0 to 7.5 and caramelizing the resulting syrup in the presence of a reducing agent.

3. The process of producing a new caramel color of high acid stability which comprises pretreating a carbohydrate syrup which has a reducing sugar content calculated as dextrose of 60 to 100% by acidifying the said syrup to a pH of 0.2-4.0 and heating the acidified syrup to a temperature of 200 to 250° F. until the reducing sugar content has been diminished by 20-65% and is lowered to a level within the range of 30-60% adding an alkaline reagent selected from the group consisting of ammonia and ammonium compounds to the digestion mass to increase the pH to 3.0-7.5 and caramelizing the resulting syrup in the presence of an ammonium compound.

4. The process of producing a new caramel color of high acid stability which comprises pretreating a carbohydrate syrup which has a reducing sugar content calculated as dextrose of 60 to 100% by acidifying the said syrup to a pH of 0.2-4.0 and heating the acidified syrup to a temperature of 200 to 250° F. until the reducing sugar content has been diminished by 20-65% and is lowered to a level within the range of 30-60%, adding an alkaline reagent selected from the group consisting of ammonia and ammonium compounds to the digestion mass to increase the pH to 3.0-7.5 and caramelizing the resulting syrup in the presence of an ammonium compound and a reducing agent.

5. The process of producing a new caramel color of high acid stability which comprises pretreating a carbohydrate syrup which has a reducing sugar content calculated as dextrose of 60 to 100% by acidifying the said syrup to a pH of 0.2-4.0 and heating the acidified syrup to a temperature of 200 to 250° F. until the reducing sugar content has been diminished by 20-65% and is lowered to a level within the range of 30-60%, adding an alkaline reagent selected from the group consisting of ammonia and ammonium compounds to the digestion mass to increase the pH to 3.0-7.5 and caramelizing the resulting syrup in the presence of an ammonium compound and sodium acid sulfite.

6. The process of producing a new caramel color of high acid stability which comprises pretreating a carbohydrate syrup which has a reducing sugar content calculated is dextrose of 60 to 100% by acidifying the said syrup to a pH of 0.2-4.0 and heating the acidified syrup to a temperature of 200 to 250° F. until the reducing sugar content has been diminished by 20-65% and is lowered to a level within the range of 30-60%, adding ammonia to bring the digestion mass to a pH of 3.0 to 7.5, heating to 200-320° F. for ¼ to 2 hours.

7. A caramelized carbohydrate solution adapted for coloring foods and beverages, said solution having the dark caramel color and being resistant to jelling during storage, the color bodies of said solution having high stability in alcohol, tannin and acid solutions and remaining clear and uncoagulated after boiling in the presence of sufficient hydrochloric acid to produce a 0.33 N solution, said solution being obtained by the process of claim 1.

J. B. LONGENECKER.

REFERENCES CITED

The following references are of record in the file of this patent:

UNITED STATES PATENTS

| Number | Name | Date |
|---|---|---|
| 1,031,602 | Weschler | July 2, 1912 |
| 1,316,019 | Daniel | Sept. 16, 1919 |
| 2,210,659 | Fetzer | Aug. 6, 1940 |

FOREIGN PATENTS

| Number | Country | Date |
|---|---|---|
| 691,704 | France | July 21, 1930 |
| 20,166 | Great Britain | of 1904 |
| 90,379 | Austria | Dec. 11, 1922 |
| 88,178 | Switzerland | Feb. 16, 1921 |